UNITED STATES PATENT OFFICE.

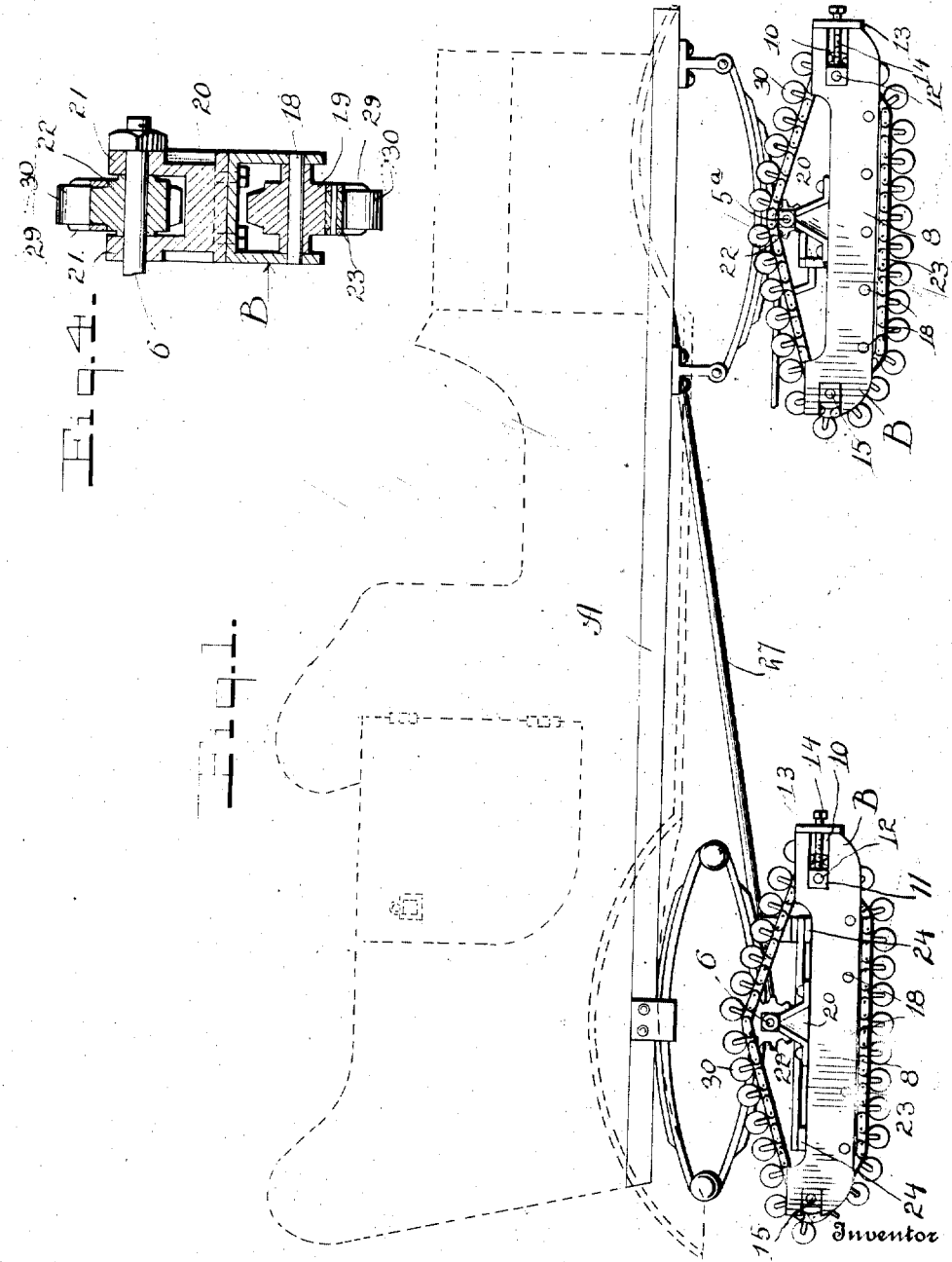

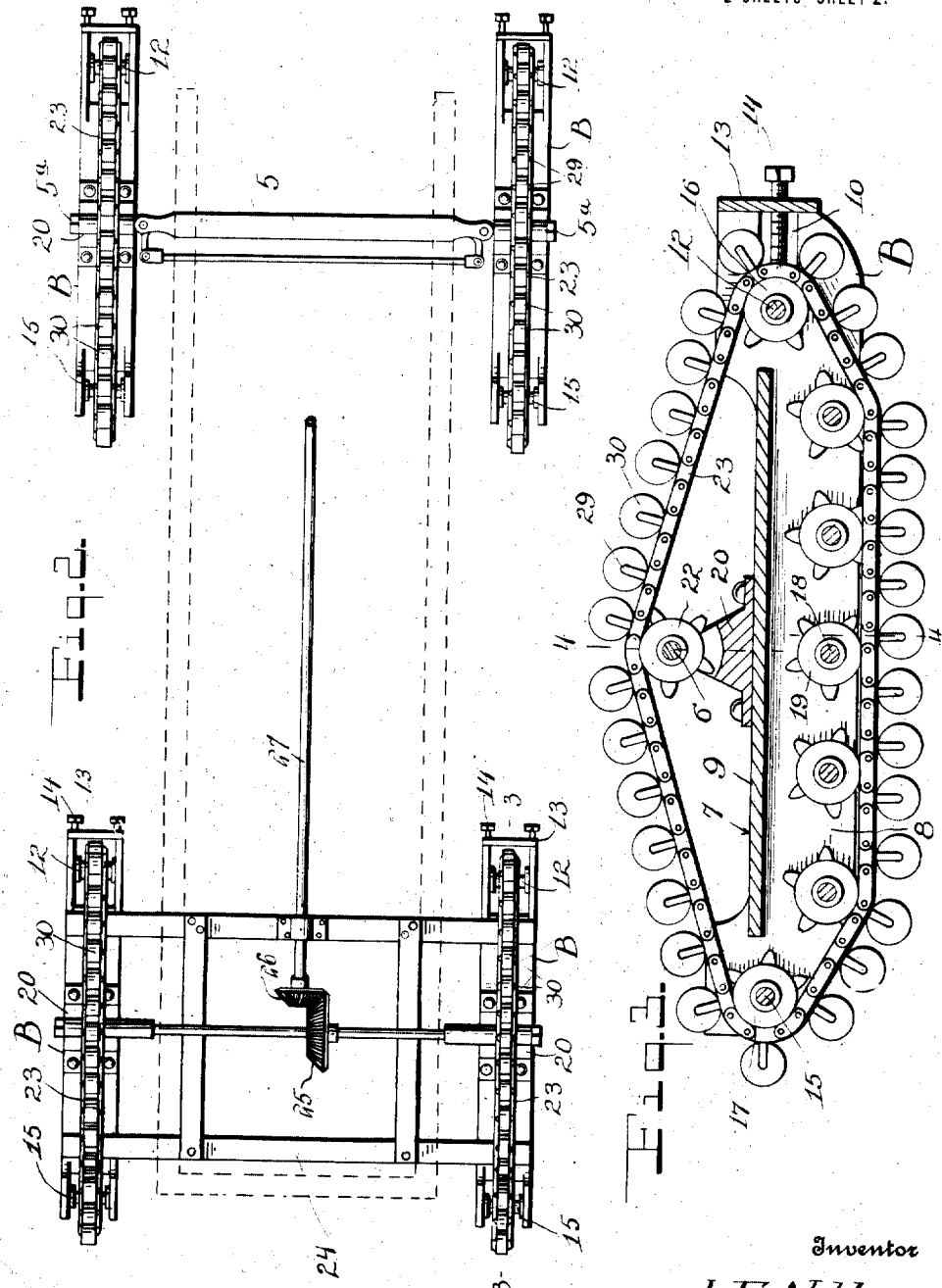

JAY E. NOBLE, OF SINCLAIRVILLE, NEW YORK.

PROPELLING MECHANISM FOR VEHICLES.

1,232,597.  Specification of Letters Patent.  Patented July 10, 1917.

Application filed November 27, 1912. Serial No. 733,881.

*To all whom it may concern:*

Be it known that I, JAY E. NOBLE, a citizen of the United States, residing at Sinclairville, in the county of Chautauqua, State of New York, have invented certain new and useful Improvements in Propelling Mechanism for Vehicles; and I do hereby declare the following to be a full, clear, and exact description of the invention, such as will enable others skilled in the art to which it appertains to make and use the same.

This invention relates to improvements in propelling mechanisms for vehicles.

The principal object of the invention is to provide a propelling mechanism of novel construction which may be readily attached to the spindles of the front and rear axles of a motor vehicle without changing the construction of said vehicle to any extent.

Another object of the invention is to provide a propelling mechanism which will insure a greater tractive power than the ordinary vehicle wheel.

A further object of the invention is to provide a propelling mechanism of the character described which is composed of a minimum number of parts, is therefore simple in construction and is cheap to manufacture.

With these and other objects in view, the invention consists in the construction and novel combination of parts hereinafter fully described, illustrated in the accompanying drawings and pointed out in the claim hereto appended, it being understood that various changes in the form, proportion, size and minor details of construction within the scope of the claim may be resorted to without departing from the spirit or sacrificing any of the advantages of the invention.

In the drawings:

Figure 1 is a side elevation of a motor vehicle showing the application of my invention.

Fig. 2 is a top plan view thereof, the body being removed and the chassis being shown in dotted lines, Fig. 3 is an enlarged longitudinal sectional view taken on the line 3—3 of Fig. 2, and Fig. 4 is a vertical transverse sectional view taken on the line 4—4 of Fig. 3.

Like reference numerals designate corresponding parts in all the figures of the drawings.

Referring to the drawings, A designates the chassis of a motor vehicle which includes the usual front and rear axles 5 and 6 respectively, the front axle including the usual spindles $5^a$—$5^a$ which are arranged to be simultaneously turned by any steering mechanism (not shown).

My invention comprises a plurality of shoes B. Each shoe consists of a longitudinal frame 7 of inverted channel iron which includes spaced side walls 8—8 and a top 9, the side walls projecting beyond the ends and above the top. Formed in the side walls 8 at one side of each shoe are inwardly extending slots 10—10, and slidably mounted in these slots are bearings 11 which support a transverse axle 12. A plate 13 is secured to the ends of the walls 8 and a tensioning screw 14 having its inner end engaged in the bearing 11 operates in the plate 13 to adjust the position of the axle 12. The side walls 8 of each shoe support at the other end an axle 15, and loose upon the axles 12 and 15 are sprocket wheels 16 and 17 respectively. A series of transverse axles 18 are supported by the side walls 8 of each shoe, and these axles are disposed in spaced relation throughout the length of the shoe. Loosely mounted on each axle is an idler sprocket wheel 19, the teeth thereof projecting below the lower edge of the side walls 8. Centrally secured upon the top 9 of each shoe is a bearing 20 which is formed with a pair of spaced upstanding perforated ears 21—21 for receiving a respective spindle of either the front or rear axle as the case may be. Fixed upon each spindle of both front and rear axles 5 and 6, and arranged intermediate a respective pair of ears 21 is a sprocket wheel 22. A sprocket chain 23 is provided for each shoe, and this chain is trained around the sprocket wheels 16, 17, 22 and idlers 19.

The rear shoes B are connected by spaced transverse members 24—24, and these rear shoes and members conjointly form a rear bob.

In order to drive the sprocket chains 23 of the rear bob, there is fixed on the axle 6 a beveled gear 25 which is in mesh with a similar gear 26 fixed to the rear end of the shaft 27, said shaft being suitably driven by the usual explosive engine.

In operation, motion will be transmitted from the shaft 27 to the rear axle 6 and thence through the sprocket wheels 22 to the chains 23. It will be observed that by means of the pivotal connection between the shoes and the axle the vehicle will readily travel over uneven surfaces.

Every other link of each sprocket chain 23 is formed with an outwardly projecting cross bar 29, and each cross bar supports a ground roller 30 of rubber or other suitable material. It will be observed in this connection that the rollers 30 operate below the shoes and consequently support said shoes above the ground to insure a sufficient traction of said rollers.

What is claimed is:—

In a device of the class described, a pair of spaced vertical walls and an overlying horizontal web longitudinally connecting said walls to form a frame, the ends of said walls being extended beyond and above the extremities of the web, a plurality of sprockets mounted in longitudinal alinement between said walls below the web, a pair of sprockets mounted in the extended portions of the walls so as to lie partially above the level of the web, means for adjusting the sprocket in one of the extended portions, a bearing mounted upon said web, a sprocket mounted in the bearing, and an endless chain tractor element mounted upon all of said sprockets.

In testimony whereof, I affix my signature, in the presence of two witnesses.

JAY E. NOBLE.

Witnesses:
ALBERT E. PHILLIPS,
ELMER A. PHILLIPS.